Patented Dec. 8, 1936

2,063,540

UNITED STATES PATENT OFFICE 2,063,540

PRODUCTS OF DIENE SYNTHESIS

Carleton Ellis, Montclair, N. J., assignor to Ellis-Foster Company, a corporation of New Jersey No Drawing. Application November 25, 1931,
Serial No. 577,403

6 Claims. (Cl. 134—26)

This invention relates to chemically altered natural resins, glyceride oils and their fatty acids, particularly drying oil fatty acids such as those derived from tung oil, such chemical modification being carried out by reaction with such raw materials as maleic acid and especially its anhydride and analogous unsaturated dicarboxylic acids or other polybasic acids or similar reacting compounds.

In a number of copending applications I have referred to maleic acid or its anhydride and the like in connection with the production of balsams and resinous bodies and so forth, involving reaction between such acid material and other substances, including bodies of the character indicated above. Thus in application, Serial No. 609,136, filed December 26, 1922, Patent No. 1,897,977, granted February 14, 1933, entitled "Artificial resins from glycerol and the like", there are disclosed polyhydric alcohol-polybasic acid condensation products modified by higher fatty acids, and agents accelerating the conversion of the polyhydric alcohol-polybasic acid condensation products into products of decreased solubility and fusibility, in which polyhydric alcohol-polybasic acid condensation products acids like maleic and fumaric acids may be utilized, the claims of that application being primarily directed to the polyhydric alcohol organic carboxylic acid condensation products containing materials capable of accelerating the conversion of such products into products of decreased fusibility and solubility. In Serial No. 61,839, filed October 10, 1925, entitled "Resinous products or compositions and process of making same", there are particularly described and claimed products and methods of making same including resinous condensation products of the polyhydric alcohol-polybasic acid type containing vegetable oils, specifically siccative oils, and acids derived from such oils in combination. Among the acids that may be employed in the production of such complexes as disclosed therein, there may be mentioned polyhydric alcohol condensation products, in which the polybasic acid is maleic or fumaric acid, but the condensation products produced with such materials specifically as maleic and fumaric acids are not specifically claimed in that application. In application, Serial No. 142,532, filed October 18, 1926, for "Coating compositions comprising a soluble cellulose compound and a protective agent", there is specifically disclosed and claimed coating compositions, such as nitrocellulose-containing compositions containing protective resins of the polyhydric alcohol-polybasic acid type, including fatty acids of the vegetable oils, particularly the siccative oils in combination in such resin complexes. As disclosed therein, polybasic acids, such as maleic and fumaric acids, may be utilized in the production of those complexes, containing also the polyhydric alcohol, the claims of that application being particularly directed to the coating compositions including film-forming cellulose derivatives, together with the phthalic glyceride type resins. In Serial No. 144,647, filed October 27, 1926, for "Resinous bodies and compositions and process of making same", there is particularly disclosed and claimed resinous condensation products of the polyhydric alcohol-polybasic acid type produced with a heat modified or heat treated fatty acid, the fatty acid thus employed being derived from animal and vegetable oils and fats, including such oils as linseed, tung, soya bean, etc. The examples of that application illustrate the production of the polyhydric alcohol-polybasic acid resins by utilizing phthalic acid or anhydride as the polybasic acid, the disclosure also illustrating the utilization of maleic acid in lieu of phthalic acid in producing those complexes claimed therein. In application, Serial No. 279,216, filed May 19, 1928, for "Products consisting of or containing resins, etc.", there are particularly described and claimed methods of producing polyhydric alcohol-polybasic acid resins, and the resins themselves, in which fatty oils or triglyceride fats or related materials are in chemical combination, the glyceride oils and fats including the drying oils, such as tung oil, being sensitized by treatment with a sensitization agent prior to the resinification reaction. For example, the drying oils may be resinified by first sensitizing them by treatment with either alcohols or organic carboxylic acids, followed by further treatments to produce resins of the polyhydric alcohol-polybasic acid type. Among the polybasic acids utilized as disclosed therein, there may be mentioned phthalic anhydride and other acids, including maleic and fumaric acids. Among the oils that may be treated, there are included tung oil, linseed oil, etc. The claims of that application are particularly directed to the products and methods of producing such products utilizing the sensitized fats or oils in the production of the polyhydric alcohol-polybasic acid resins. In Serial No. 425,711, filed February 3, 1930, for "Water and resin compositions", there are particularly disclosed and claimed polyhydric alcohol-polybasic acid resins in the form of alkali salts soluble in water. In the instant specification, the claims are particularly directed to the diene reaction products of rosin with maleic acid, or with maleic anhydride, and of rosin and tung oil or tung oil acids with maleic acid or maleic anhydride, these diene reaction products claimed herein not being specifically claimed in the prior applications referred to.

In application, Serial No. 549,334, filed July 7, 1931, entitled "Reaction products and process of making same", there are described and claimed diene reaction products of drying oils or drying oil acids with an acidic compound containing the —CO—C=C group, such as maleic acid or anhydride, salts of such reaction products, aqueous alkaline solutions of such reaction products, and methods of making the same. In application, Serial No. 555,868, filed August 7, 1931, entitled "Diene type reaction product, etc.", there are particularly described and claimed the ammonium salts of the heat reaction products of a drying oil or drying oil acids with an organic compound containing the group —CO—CH=, together with methods of making the same. In the instant specification, there are particularly described and claimed the diene reaction products of rosin and maleic acid or anhydride, and of rosin and tung oil or tung oil acids with maleic acid or anhydride. In application, Serial No. 581,077, filed December 14, 1931, entitled "Ellisol paint and varnish, etc.", there are particularly described and claimed the ammonium derivatives of the diene reaction products of rosin and maleic acid or anhydride, the ammonium derivatives of rosin and tung oil diene reaction products with acids having the —CO—C=C group, other salts of the diene-rosin combinations referred to, aqueous solutions of such salts of the rosin-diene reaction products, and compositions for coating purposes containing any of the diene reaction products referred to, as well as those of a drying oil or drying oil acid with an acidic compound containing the —CO—C=C group, which composition also includes pigments, and which compositions may also include various added components including proteins, cellulose esters, lower alcohols, and plasticizers, together with articles of manufacture carrying a multiplicity of coatings, one of which is a diene type compound of the character described immediately above. In application, Serial No. 612,648, filed May 20, 1932, entitled "Diene resin", there are particularly described and claimed the diene reaction products of natural resins, such as rosin, with acidic compounds containing the —CO—C=C group, specifically the rosin-fumaric diene reaction product, the natural resin ester diene reaction products with such acidic coupling compounds containing the —CO—C=C group, and the polyhydric alcohol derivatives of the named diene reaction products, for example, rosin-maleric glyceride, as well as solutions of the stated products in organic solvents. In application, Serial No. 710,561, filed February 9, 1934, entitled "Varnish bases and process of making same", there are particularly described and claimed reaction products of cashew liquid with alpha-beta unsaturated acids, such as maleic acid, together with such reaction products in compositions with drying oils, and methods of making the same.

In the production of such balsams and resinous bodies there may be listed a number of crystalline organic acids in which list maleic acid is specified coupled with the statement that the anhydride of the acid may be used to advantage in some cases, likewise the employment of substances yielding the acid during the reaction. Among the usable drying oils mentioned is China-wood oil or tung oil. The following example illustrates a phthalic condensation product:—94 parts of glycerol, 160 parts of phthalic anhydride and 80 parts tung oil were heated, the temperature being gradually brought to 235° C. in 1 hour and 20 minutes. Proceeding according to the present invention an equivalent amount of, for example, maleic acid may replace the phthalic anhydride.

*Example 1*

94 parts glycerol, 125 parts maleic acid and 80 parts tung oil were heated gradually to 235° C. during a period of 1 hour and 20 minutes. At first the oil formed an upper layer but as the temperature increased the oily layer gradually mingled with the liquid beneath, this change being noticed particularly from 190° C. and upwards. A dark yellow colored melt was obtained which when cooled assumed a light yellow rubbery form.

As stated in aforesaid copending applications, maleic anhydride may be used in place of maleic acid. This, it may be noted, is frequently advantageous as foaming during heating of the reaction mixture thereby is greatly reduced.

*Example 2*

94 parts glycerol, 105 parts maleic anhydride and 80 parts tung oil were heated gradually to 235° C. during 1 hour and 20 minutes. At first the oil formed a distinct upper layer and assumed a brilliant yellow color. As the temperature was raised and as the mixture was agitated solution occurred to form an apparently homogeneous melt. At the same time the bright color of the oil became modified. When cool the product was a light yellow rubbery material of about the same appearance as the product derived according to Example 1.

Taking portions of the resins obtained according to Examples 1 and 2 and also some of the resin prepared in like manner as described above but using phthalic anhydride, weighed quantities of each of these resins were saponified by heating with sodium hydroxide solution until dissolved. The clear solutions of glycerol and sodium compounds thus obtained were acidified with hydrochloric acid liberating the oil-acids which separated as an oily phase and the water-soluble organic acids which remained in solution. The oil-acids thus separated were collected and washed repeatedly with hot water to free them from any occluded water-soluble acid. These oil-acids were then dried in a vacuum oven and a determination of acid numbers of these oil-acids then was made. The results obtained are as follows:

Maleic acid oil-acids according to Example 1, acid number 327.

Maleic anhydride oil-acids according to Example 2, acid number 307.

Phthalic anhydride oil-acids as prepared above, acid number 191.

The last mentioned oil-acids, namely those derived from the phthalic anhydride formula, were different in physical properties from the oil-acids obtained by the saponification according to Examples 1 and 2. The oil-acids from the phthalic anhydride formula as derived from the sodium hydroxide solution constituted an oil lighter than water and at ordinary temperatures assumed a solid form with the crystalline characteristics of ordinary tung oil acids. The acids from Examples 1 and 2, however, were heavy oils at ordinary temperature and were in fact heavier than water. The marked difference in the acid numbers as well as physical properties of the oil-acids derived according to Examples 1 and 2 in which maleic acid and maleic anhydride respectively are used is to be ascribed to the reaction between the maleic group and some of the unsaturated components of the tung acids with formation of new compounds.

*Example 3*

Phthalic anhydride was used in this case in the same proportions as given under the example given above, viz: 94 parts glycerol, 160 parts phthalic anhydride, 80 parts tung oil. The temperature, however, was carried only to 150° C. during a period of 30 minutes. When cool a supernatant dark-colored clear oily layer separated, leaving a hard lower layer. The oil was poured off and treated with aqueous ammonium hydroxide solution. This, however, was found to be insoluble in the ammonia solution and floated on top thereof apparently unchanged.

*Example 4*

A mixture containing the same ingredients and proportions as in Example 1 (maleic acid) was likewise heated to 150° C. during a period of 30 minutes, corresponding to the procedure under Example 3. On cooling somewhat a viscous oily layer separated. This was poured off and treated with aqueous ammonium hydroxide solution, yielding a clear light-colored and viscous solution. In other words, the maleic acid had reacted even at 150° C. to give a product of different properties from that obtained when phthalic anhydride was used.

It is thus seen that when tung oil and maleic acid or anhydride are brought together in a mixture and heated, reaction between the two occurs. This reaction is formulated as a diene synthesis. The term "maleinized" is utilized herein to cover treatment with maleic acid or anhydride, or materials generating such substances to form a reaction product containing maleic acid or anhydride, or the corresponding groups in combination with the substance treated. A diene reaction product is the product resulting from reaction of substances, one at least of which substances contains a conjugated double bond through which reaction takes place.

Another example was produced by taking glycerol 23 parts, benzoic acid 60 parts, and the free fatty acids of tung oil 40 parts, the temperature being raised gradually to 260° C. over a period of 2 hours. A resin was prepared in this manner for comparison with the product made with maleic acid in place of the benzoic acid.

*Example 5*

23 parts glycerol, 29 parts maleic acid and 40 parts tung oil acids were heated gradually. After one and one-half hours, and when the temperature had reached 230° C., polymerization of the mixture to a tough, light-colored rubbery mass occurred.

Taking portions of the resin obtained according to Example 5, and of the resin prepared as stated above, which uses benzoic instead of maleic acid, weighed quantities of each of these resins were saponified by heating with sodium hydroxide solution until dissolved, as mentioned in connection with Examples 1 and 2. The clear solutions of glycerol and sodium compounds thus obtained were acidified, while hot, with hydrochloric acid, liberating the oil-acids which separated as an oily phase, and the water soluble organic acids which remained in solution. The oil-acids were separated and washed repeatedly with hot water to free them from any occluded water-soluble acid. These oil-acids were then dried and a determination of acid numbers of these oil-acids was made with the following results.

Maleic acid oil-acids according to Example 5, acid number 284.

Benzoic acid oil-acids according to the above example, acid number 201.

Here again there was noted a difference in physical properties of the oil-acids. The oil-acids from the benzoic acid formula as derived from the sodium hydroxide solution constituted an oil lighter than water and at ordinary temperature they assumed a solid form with the crystalline characteristics of ordinary tung oil acids. On the other hand, the oil-acids from Example 5 were of an oily nature and heavier than water. These facts coupled with the distinct difference in the acid numbers of the two, shows that a combination has occurred between the maleic acid and the tung oil acids.

Part of the phthalic anhydride in a resin may be replaced by another polybasic acid or anhydride. Thus, half of the phthalic anhydride in the examples given above, may be replaced by maleic anhydride.

*Example 6*

94 parts glycerol, 80 parts phthalic anhydride, 52.5 parts maleic anhydride and 80 parts tung oil were mixed and heated slowly to 150° C. during one-half hour. The mixture was then allowed to cool and the supernatant oily layer which formed was poured off. This oily material was washed with hot water to free it from unreacted acids and was then treated with ammonia-water. A clear, viscous solution of the oil was formed.

Fatty acids may be obtained from several sources such as corn, cottonseed, linseed, tung, castor, rape, fish, lard, tallow, peanut, soya bean oil and other vegetable and animal fats and oils. Any of these reactive from the standpoint of the present invention are included herein. Likewise the order of mixing may be varied in that part of the reagents may be partially reacted or resinified in advance of the complete reaction. Thus I may heat the reactive fatty acid and the second acid (unsaturated and usually containing a lesser number of carbon atoms than the fatty acid) to a partially reacted state and then add whatever additional reacting substances that are required to complete the composition of the product, heating or otherwise conducting the reaction to the stage desired.

Ordinary rosin likewise is reactive with maleic acid and anhydride, the compound formed by the diene synthesis being secured simply by heating the maleic component with molten rosin, preferably raising the temperature in the manner described in the foregoing. A proportion of about 30 parts maleic acid to 100 parts of rosin is desirable. Mixtures of tung oil or tung oil fatty acids with rosin may be heated with maleic acid and a varnish-like basis secured. For example, 100 parts each of tung oil and rosin are heated with 60 parts of maleic acid, the temperature being carried to about 250° or 260° C. Products thus are obtained which are readily soluble in dilute solutions of sodium hydroxide or ammonium hydroxide. When the proportion of the alkaline agent is present only to an extent sufficient to neutralize the acidity of the compound or composite, saponification does not take place but instead the salt of the tung-maleic compound or rosin-maleic compound is formed and dissolves in the aqueous medium.

What I claim is:

1. A modified natural resin adapted for use in coating compositions which comprises the reaction product of rosin and maleic acid.

2. A modified natural resin adapted for use in coating compositions comprising the reaction product of rosin and maleic anhydride.

3. A varnish base comprising the reaction product of tung oil and maleic acid and the reaction product of rosin and maleic acid, both oil and rosin reaction product being readily soluble in dilute aqueous alkalies.

4. A varnish base comprising the reaction product of rosin and maleic anhydride and the reaction product of maleic anhydride and the free fatty acids of tung oil.

5. A varnish base comprising the products of interaction of maleic acid, rosin and the free fatty acids of tung oil.

6. A varnish base comprising the products of interaction of maleic anhydride, rosin and the free fatty acids of tung oil.

CARLETON ELLIS.

Certificate of Correction

Patent No. 2,063,540. December 8, 1936.

CARLETON ELLIS

It is hereby certified that errors appear in the printed specification of the above numbered patent requiring correction as follows: Page 4, first column, line 15, beginning with "1. A modified natural" strike out all to and including the word and period "anhydride." in second column, line 2, comprising claims 1 and 2 and for the claims now appearing as "3" and "4" read *1* and *2* respectively; line 11, after "tung oil." insert the following claims—

3. A varnish base comprising the products of interaction of tung oil, rosin and maleic acid.

4. A varnish base comprising the products of interaction of tung oil, rosin and maleic anhydride.

and that the said Letters Patent should be read with these corrections therein that the same may conform to the record of the case in the Patent Office.

Signed and sealed this 9th day of March, A. D. 1948.

[SEAL]

THOMAS F. MURPHY,
*Assistant Commissioner of Patents.* acid and a varnish-like basis secured. For example, 100 parts each of tung oil and rosin are heated with 60 parts of maleic acid, the temperature being carried to about 250° or 260° C. Products thus are obtained which are readily soluble in dilute solutions of sodium hydroxide or ammonium hydroxide. When the proportion of the alkaline agent is present only to an extent sufficient to neutralize the acidity of the compound or composite, saponification does not take place but instead the salt of the tung-maleic compound or rosin-maleic compound is formed and dissolves in the aqueous medium.

What I claim is:

1. A modified natural resin adapted for use in coating compositions which comprises the reaction product of rosin and maleic acid.

2. A modified natural resin adapted for use in coating compositions comprising the reaction product of rosin and maleic anhydride.

3. A varnish base comprising the reaction product of tung oil and maleic acid and the reaction product of rosin and maleic acid, both oil and rosin reaction product being readily soluble in dilute aqueous alkalies.

4. A varnish base comprising the reaction product of rosin and maleic anhydride and the reaction product of maleic anhydride and the free fatty acids of tung oil.

5. A varnish base comprising the products of interaction of maleic acid, rosin and the free fatty acids of tung oil.

6. A varnish base comprising the products of interaction of maleic anhydride, rosin and the free fatty acids of tung oil.

CARLETON ELLIS.

Certificate of Correction

Patent No. 2,063,540.

December 8, 1936.

CARLETON ELLIS

It is hereby certified that errors appear in the printed specification of the above numbered patent requiring correction as follows: Page 4, first column, line 15, beginning with "1. A modified natural" strike out all to and including the word and period "anhydride." in second column, line 2, comprising claims 1 and 2 and for the claims now appearing as "3" and "4" read *1* and *2* respectively; line 11, after "tung oil." insert the following claims—

3. A varnish base comprising the products of interaction of tung oil, rosin and maleic acid.

4. A varnish base comprising the products of interaction of tung oil, rosin and maleic anhydride.

and that the said Letters Patent should be read with these corrections therein that the same may conform to the record of the case in the Patent Office.

Signed and sealed this 9th day of March, A. D. 1948.

[SEAL]

THOMAS F. MURPHY,
*Assistant Commissioner of Patents.*

Certificate of Correction

Patent No. 2,063,540.  December 8, 1936.

CARLETON ELLIS

It is hereby certified that errors appear in the printed specification of the above numbered patent requiring correction as follows: Page 4, first column, line 15, beginning with "1. A modified natural" strike out all to and including the word and period "anhydride." in second column, line 2, comprising claims 1 and 2 and for the claims now appearing as "3" and "4" read *1* and *2* respectively; line 11, after "tung oil." insert the following claims—

> 3. A varnish base comprising the products of interaction of tung oil, rosin and maleic acid.
>
> 4. A varnish base comprising the products of interaction of tung oil, rosin and maleic anhydride.

and that the said Letters Patent should be read with these corrections therein that the same may conform to the record of the case in the Patent Office.

Signed and sealed this 9th day of March, A. D. 1948.

[SEAL]

THOMAS F. MURPHY,
*Assistant Commissioner of Patents.*